(12) United States Patent
Ito

(10) Patent No.: US 7,944,499 B2
(45) Date of Patent: May 17, 2011

(54) SINGLE LENS REFLEX TYPE ELECTRONIC IMAGING APPARATUS

(75) Inventor: Junichi Ito, Fuchu (JP)

(73) Assignee: Olympus Imaging Corporation, Tokyo (JP)

( * ) Notice: Subject to any disclaimer, the term of this patent is extended or adjusted under 35 U.S.C. 154(b) by 688 days.

(21) Appl. No.: 11/977,408

(22) Filed: Oct. 24, 2007

(65) Prior Publication Data

US 2008/0198258 A1 Aug. 21, 2008

(30) Foreign Application Priority Data

Feb. 15, 2007 (JP) ................................ 2007-034919

(51) Int. Cl.
*H04N 5/232* (2006.01)
(52) U.S. Cl. .......................... 348/345; 348/349; 348/353
(58) Field of Classification Search .................. 348/345, 348/349, 353
See application file for complete search history.

(56) References Cited

U.S. PATENT DOCUMENTS

| 5,597,999 A * | 1/1997 | Kinba et al. ............... 250/201.7 |
| 2001/0026683 A1* | 10/2001 | Morimoto et al. .............. 396/89 |
| 2006/0127080 A1* | 6/2006 | Mori et al. .................... 396/121 |

FOREIGN PATENT DOCUMENTS

| JP | 2000-333064 A | 11/2000 |
| JP | 2001-309225 A | 11/2001 |
| JP | 2003-107335 A | 4/2003 |
| JP | 2003-107555 A | 4/2003 |

* cited by examiner

*Primary Examiner* — James M Hannett
(74) *Attorney, Agent, or Firm* — Holtz, Holtz, Goodman & Chick, PC

(57) ABSTRACT

There is disclosed an electronic imaging apparatus capable of selecting a first observation mode in which a subject image is observed using an optical finder and a second observation mode in which the subject image is acquired as image data from an image pickup device and is displayed in a monitor. In this electronic imaging apparatus, subject information (e.g., a person position) recognized based on the image data from the image pickup device in the second observation mode is succeeded even in the first observation mode, and shooting conditions can be set based on the subject information even in the first observation mode.

6 Claims, 12 Drawing Sheets

| IMAGE PICKUP AREA | | | | | | |
|---|---|---|---|---|---|---|
| EA1 | EA2 | EA3 | EA4 | EA5 | EA6 | EA7 |
| EA8 | EA9 | EA10 | EA11 | EA12 | EA13 | EA14 |
| EA15 | EA16 | EA17 | EA18 | EA19 | EA20 | EA21 |
| EA22 | EA23 | EA24 | EA25 | EA26 | EA27 | EA28 |
| EA29 | EA30 | EA31 | EA32 | EA33 | EA34 | EA35 |
| EA36 | EA37 | EA38 | EA39 | EA40 | EA41 | EA42 |
| EA43 | EA44 | EA45 | EA46 | EA47 | EA48 | EA49 |

SINGLE LENS REFLEX TYPE ELECTRONIC IMAGING APPARATUS

CROSS-REFERENCE TO RELATED APPLICATION

This application is based upon and claims the benefit of priority from prior Japanese Patent Application No. 2007-034919, filed on Feb. 15, 2007, the entire contents of which are incorporated herein by reference.

BACKGROUND OF THE INVENTION

1. Field of the Invention

The present invention relates to a single lens reflex type electronic imaging apparatus capable of selecting a first observation mode in which a subject image can optically be observed via an optical finder and a second observation mode in which the subject image can be shot with an image pickup device to electrically observe the image via a monitor.

2. Description of the Related Art

A technology is known in which a position of a person's face is detected from image data obtained by an image pickup device.

For example, in an imaging apparatus disclosed in Japanese Patent Application Laid-Open No. 2003-107335, the position of the face of the person as a subject is detected from the image data obtained by an image pickup device such as a CCD, and this position is selected as a distance measurement area to perform an auto focusing operation (the AF operation).

In an imaging apparatus disclosed in Japanese Patent Application Laid-Open No. 2003-107555, the position of the face of the person as the subject is detected from the image data obtained by an image pickup device such as the CCD, and this position is selected as a light metering area to perform an automatic exposure adjustment operation (the AE operation) for determining exposure conditions.

In an imaging apparatus disclosed in Japanese Patent Application Laid-Open No. 2001-309225, attribute data (a position, a direction, a scale, a pause, etc.) of the face is detected from the image data obtained from an image pickup device such as the CCD, and the attribute data is recorded together with the image data in a recording medium, so that the attribute data can be used.

On the other hand, as an observation mode of the subject in the electronic imaging apparatus, it is known that an optical finder is used, or an image obtained by the image pickup device is displayed in a monitor.

For example, a digital single lens reflex camera (DSLR) disclosed in Japanese Patent Application Laid-Open No. 2000-333064 includes two observation modes of a first observation mode capable of observing the subject by use of the optical finder and a second observation mode capable of observing the image data obtained from the image pickup device via a display monitor.

The second observation mode described in Japanese Patent Application Laid-Open No. 2000-333064 is generally referred to as live view display or through image display. The live view display is a standard function mounted on most of compact cameras which are digital cameras other than the DSLR. In the DSLR, the live view display is not the standard function, but this function is supposed to be standard in the same manner as in the compact camera in future.

Moreover, as disclosed in Japanese Patent Application Laid-Open Nos. 2003-107335 and 2003-107555, a compact camera is already commercially available in which during the live view display, a characteristic point (the face) of the person is detected using an image recognition algorithm, and the AF operation, the AE operation and the like are controlled based on the detection result. Since such functions are mounted, even a user who is unaccustomed to a camera operation can focus on the person to take a picture with an exposure adjusted on the person.

BRIEF SUMMARY OF THE INVENTION

An electronic imaging apparatus of the present invention succeeds to subject information (e.g., a person position) recognized in a second observation mode based on image data from an image pickup device when the observation mode of the apparatus changes from the second observation mode to the first observation mode, so that setting of shooting conditions based on the subject information can be realized even in the first observation mode.

One example of a constitution of the electronic imaging apparatus according to the present invention can be described as follows. A single lens reflex type electronic imaging apparatus which is configured to select a first observation mode to observe a subject image by use of an optical finder and a second observation mode to acquire the subject image as image data from an image pickup device and display and observe the image data in a monitor, the apparatus comprising: a first shooting condition setting section which sets shooting conditions during the observation in the first observation mode; a recognizing section which detects a person position based on the image data from the image pickup device to recognize a person during the observation in the second observation mode; a second shooting condition setting section which sets the shooting conditions based on the image data so that the person recognized by the recognizing section is appropriately shot during the observation in the second observation mode; and a control section which succeeds to information on the person recognized by the recognizing section to control the setting of the shooting conditions by the first shooting condition setting section so that this person is appropriately shot, in a case where the observation mode is switched from the second observation mode to the first observation mode.

The present invention can also be understood as the invention of an imaging method in the electronic imaging apparatus.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Preferred embodiments of the invention are described below with reference to the accompanying drawings.

Figure 1:
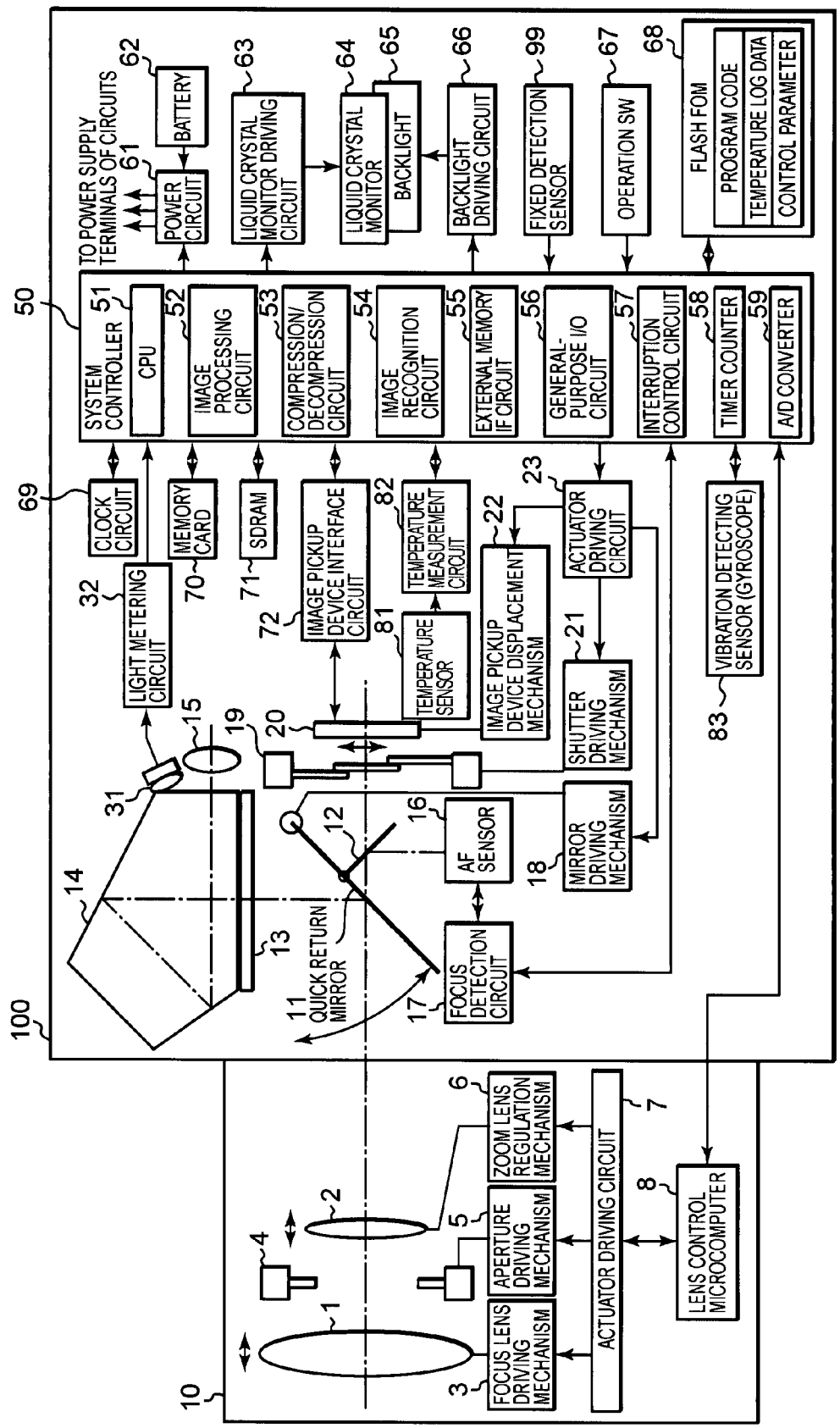
FIG. 1 is a block diagram showing a schematic constitution example of a single lens reflex type electronic camera according to an embodiment of the present invention.

FIG. 1 is a block diagram showing a schematic constitution example of a single lens reflex type electronic camera according to the present embodiment. The single lens reflex type electronic camera (hereinafter referred to simply as "the SLR camera") of the present embodiment is constituted so as to select a first observation mode (OPT) in which a subject image formed by a photographing lens via an optical finder is observed via an optical finder and a second observation mode (EVF) in which the subject image formed by the photographing lens is acquired as image data from an image pickup device to observe the acquired image data via a monitor.

The SLR camera has a body system 100 and an interchangeable lens system 10 detachably attached to this body system 100.

First, a schematic constitution and a function of a body system 100 side will be described. The body system 100 includes a system controller 50 which executes control of the whole SLR camera. This system controller 50 has a CPU 51 and a plurality of control blocks. The plurality of circuit blocks are constituted of, for example, an image processing circuit 52, a compression/decompression circuit 53, an image recognition circuit 54, an external memory IF circuit 55, a general-purpose I/O circuit 56, an interruption control circuit 57, a timer counter 58, an A/C converter 59 and the like. The CPU 51 is connected to the respective circuit blocks 52 to 59 via a control line and a bus line.

The image processing circuit 52 performs predetermined processing such as γ correction, color conversion, pixel conversion and white balance processing with respect to the image data shot with an image pickup device 20 such as a CCD and captured from an image pickup device interface circuit 72. The compression/decompression circuit 53 performs compression processing of the image data processed by the image processing circuit 52 and decompression processing of the compressed image data read from a memory card 70. The image recognition circuit 54 executes image processing required in detecting a characteristic point of a person's face as a subject from the image data shot with the image pickup device 20 by use of a predetermined image recognition algorithm, whereby a function of a recognizing section is realized.

The external memory IF circuit 55 performs a bridge function of the memory card 70, an SDRAM 71 and a flash ROM 68 with respect to a data bus in the system controller 50. Here, in the flash ROM 68, a control program for controlling the whole operation of the camera, temperature log data, a control parameter and the like are recorded. The system controller 50 controls an operation of the camera, when the CPU 51 reads the control program stored in the flash ROM 68 to execute the program. The SDRAM 71 is used as temporary storage of the image data obtained via the image pickup device interface circuit 72 and as a work area of the system controller 50. The memory card 70 is an attachable/detachable recording medium such as a nonvolatile memory of a semiconductor or a small-sized HDD.

Moreover, the general-purpose I/O circuit 56 is used as a reading terminal of an operation switch (SW) 67 connected to the system controller 50 or an output terminal of a control signal which controls peripheral circuits. The interruption control circuit 57 generates an interruption signal of the operation SW 67, an interruption signal of the timer counter 58 and the like. The timer counter 58 counts clocks to generate a timing signal required for system control. The A/C converter 59 A/D converts detection outputs of various sensors such as a light metering sensor 31 disposed on the SLR camera and a temperature sensor 81.

Furthermore, a time circuit (a real time clock) 69 generates time data of year, month, day, hour, minute and second to output the data to the system controller 50. The image pickup device 20 includes a CCD, a CMOS image sensor and the like, and photoelectrically converts the subject image formed by a photographing lens 1 into an analog electric signal. The image pickup device interface circuit 72 generates timing pulses to drive the image pickup device 20, reads the analog electric signal photoelectrically converted by the image pickup device 20, and A/D converts the signal to transfer the image data to the system controller 50.

The temperature sensor 81 constitutes a temperature detecting section together with a temperature measurement circuit 82, and is disposed in the vicinity of the image pickup device 20 to detect the temperature of the image pickup device 20. As the temperature sensor 81, a device whose resistance value changes with the temperature or a semiconductor temperature sensor is used. To more accurately measure the temperature, the semiconductor temperature sensor may be formed in a circuit constituting the image pickup device 20. In the image pickup device 20, noises are generated by a dark current. It is known that when the temperature rises as much as 7 to 10° C., the dark current is approximately doubled. Therefore, when the temperature of the image pickup device 20 is measured, a noise level of the image pickup device can be detected (or the noise level can be predicted). That is, the temperature sensor and the temperature measurement circuit constitute a noise level detecting section (a noise level predicting section).

A vibration detecting sensor (gyroscope) 83 detects vibration generated in the SLR camera. The vibration detecting sensor 83 is also used as a composition change amount detecting section. Two blur correcting operations are executed using an output of this vibration detecting sensor 83.

A first blur correcting operation is performed during live view display. The CPU 51 changes a reading position on the image data acquired at a predetermined frame rate based on an output of the vibration detecting sensor 83, and outputs the image data on which the reading position has been changed to a liquid crystal monitor 64, so that the image can be displayed in the liquid crystal monitor 64 without any blur. That is, the first blur correcting operation is an electronic blur correcting operation using the vibration detecting sensor 83 (a first blur correcting section).

A second blur correcting operation is performed during a shooting operation (i.e., during acquisition of still image data). An image pickup device displacement mechanism 22 is driven in response to an output of the vibration detecting sensor 83 to displace the image pickup device 20 on a plane vertical to an optical axis of the photographing lens 1. This correcting operation corrects the blur generated in a still image. A driving power of the image pickup device displacement mechanism 22 with respect to an actuator is supplied from an actuator driving circuit 23. As another method, in response to the output of the vibration detecting sensor 83, a part of the photographing lens 1 may be displaced to correct the blur. That is, the second blur correcting operation is an optical blur correcting operation using the vibration detecting sensor 83 (a second blur correcting section).

A shutter 19 is disposed at a front surface of the image pickup device 20 on an exposure surface side, and is opened/closed by a shutter driving mechanism 21 to control light shielding and exposure of the image pickup device 20. The driving power of the shutter driving mechanism 21 with respect to the actuator is also supplied from the actuator driving circuit 23.

A quick return mirror (QR mirror) 11 is an optical path switch member which is disposed at the front surface of the image pickup device 20 on the exposure surface side so as to be movable between a down position and an up position. The down position of the QR mirror 11 is a position present in an optical path of the photographing lens 1 and in which the subject image formed by the photographing lens 1 is guided toward a focus mat 13 (a penta prism 14). The up position is a position retracted from the optical path of the photographing lens 1 in order to guide the subject image formed by the photographing lens 1 toward the image pickup device 20. The QR mirror 11 is displaced and driven by a mirror driving mechanism 18. The driving power of the mirror driving mechanism 18 with respect to the actuator is supplied from the actuator driving circuit 23. Here, when the QR mirror 11 is present at the down position, the subject image on the focus mat 13 can be observed with the optical finder including the penta prism 14 and an eyepiece lens 15.

A light metering circuit 32 amplifies an output of the light metering sensor 31 which measures brightness of the subject image via the optical finder (the penta prism 14), and outputs an electric signal based on luminance to the system controller 50. The CPU 51 determines exposure conditions among shooting conditions in response to an output of the light metering circuit 32. Here, during a live view operation, since the QR mirror 11 is present at the up position, the light metering circuit 32 cannot be used. To solve the problem, during the live view operation, the CPU 51 detects the subject luminance based on an image data output obtained from the image pickup device 20 to detect the exposure conditions among the shooting conditions of the still image.

Moreover, the QR mirror 11 has a semi-transmission area at the center thereof. When the mirror is present at the down position, a part of a luminous flux of the photographing lens 1 transmitted through the central semi-transmission area is reflected by a sub-mirror 12, and guided to an auto focus (AF) sensor 16. As this AF sensor 16, a well-known phase difference type of AF sensor is used. The AF sensor 16 is controlled by a focus detection circuit 17. The CPU 51 detects the defocus amount which is a deviation amount between the position of the subject image formed by the photographing lens 1 and a light receiving surface of the image pickup device 20 based on an output of the focus detection circuit 17. This defocus amount is transmitted to a lens control microcomputer 8 disposed on an interchangeable lens system 10 side to drive the photographing lens 1 (a first focusing section).

On the other hand, sharpness (contrast) of the image data is detected from the image data obtained from the image pickup device 20, so that the subject image of the photographing lens 1 can be formed on the light receiving surface of the image pickup device 20 in a focused state. The contrast is detected by the image processing circuit 52, the photographing lens 1 is driven based on this contrast, and the photographing lens 1 is positioned at a position where the contrast is maximized, whereby the focused state is achieved (a second focusing section). During the live view operation, the focusing is performed by an AF operation of a so-called contrast system in this manner.

That is, the first focusing section (a focusing operation of a phase difference system) operates in the first observation mode (OPT), and the second focusing section (a focusing operation of the contrast system) operates in the second observation mode (EVF).

A power circuit 61 converts a voltage of a battery 62 into a necessary driving voltage to supply the voltage of the system controller 50 and a peripheral circuit of the controller. Distribution of the power is controlled based on an instruction of the CPU 51. A liquid crystal monitor driving circuit 63 drives the liquid crystal monitor 64. The liquid crystal monitor 64 displays the image data during the live view operation or displays various menus and the like in response to driving signals from the liquid crystal monitor driving circuit 63. A backlight driving circuit 66 drives and turns on a backlight 65 of an LED or the like disposed at a back surface of the liquid crystal monitor 64.

Moreover, the operation SW 67 is a switch for operating the SLR camera, and includes a release SW, a mode setting SW, a finder mode selection SW, a power SW and the like.

A fixation detection sensor 99 is a sensor for detecting that a camera body is fixed to a certain fixing device (e.g., a tripod or an optical device such as a microscope). A photo reflector is disposed on, for example, a bottom surface of the camera. Then, this photo reflector detects that the camera is fixed to the tripod. Alternatively, a switch which turns on in a case where the tripod is attached to the bottom surface of the camera may be disposed and used as the sensor.

Next, a schematic constitution and a function of the lens system 10 side will be described. The lens system 10 is controlled by a lens control microcomputer 8. When the interchangeable lens system 10 is mounted on the body system 100, the lens control microcomputer 8 is connected to the system controller 50 via a communication line. Then, in response to an instruction from the system controller 50, the lens control microcomputer 8 performs a predetermined operation.

A zoom lens driving mechanism 6 is a mechanism for changing a focal length of the photographing lens 1, and movably displaces a zoom lens 2. The zoom lens driving mechanism 6 is provided with an actuator, and driven by a supply power from an actuator driving circuit 7. The lens control microcomputer 8 can change the focal length via the actuator driving circuit 7. An aperture 4 which limits a luminous flux of the photographing lens 1 is driven by an aperture driving mechanism 5. The aperture driving mechanism 5 is provided with an actuator, and driven by a supply power from the actuator driving circuit 7. The lens control microcomputer 8 can set the aperture to a predetermined value via the actuator driving circuit 7. A focus lens driving mechanism 3 is provided with an actuator, and driven by a supply power from the actuator driving circuit 7. The lens control microcomputer 8 can displace the photographing lens 1 via the actuator driving circuit 7. The lens control microcomputer 8 controls the position of the photographing lens 1 based on the defocus amount transferred from the system controller 50.

Figure 2:
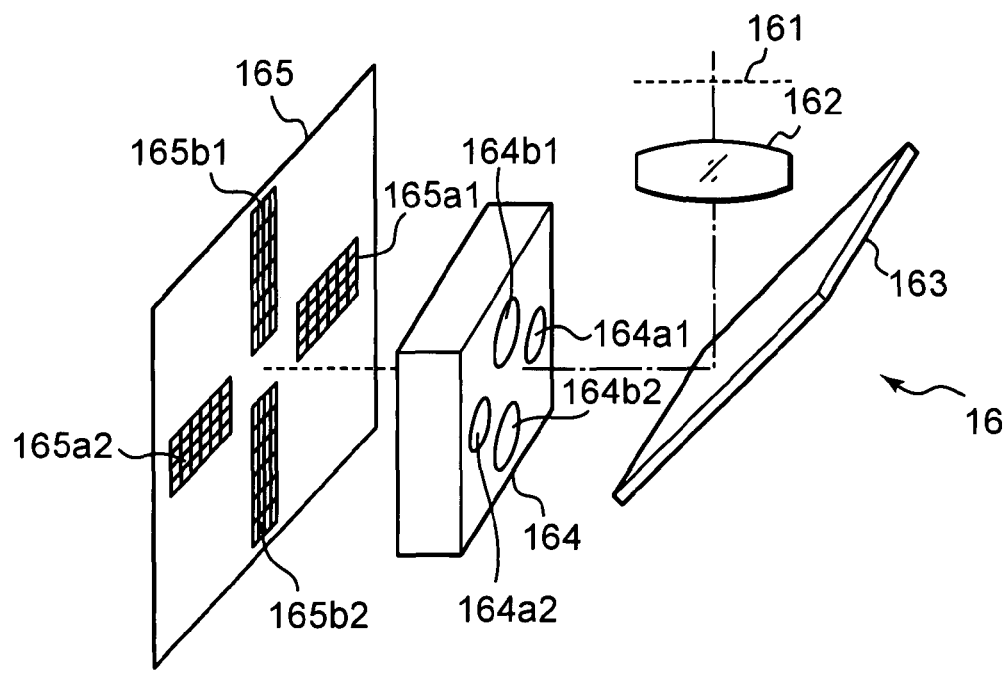
FIG. 2 is a schematic perspective view showing a constitution example of an AF sensor.

FIG. 2 shows a constitution example of the AF sensor 16 of the phase difference system. The luminous flux of the photographing lens 1 is reflected by the QR mirror 11 and the sub-mirror 12 to form the subject image on a first image forming surface 161 in the vicinity of the AF sensor 16. This subject image is guided to a separator lens 164 via a condenser lens 162 and a mirror 163. The separator lens 164 is constituted of two pairs of lenses 164a1, 164a2 and lenses 164b1, 164b2, and images formed by the lenses are formed on corresponding sensor groups 165a1, 165a2, 165b1 and 165b2 on a photoelectric conversion device 165. Here, calculation is performed to obtain a phase difference between images with respect to outputs of the sensor groups 165a1, 165a2 forming a pair in a horizontal direction and outputs of the sensor groups 165b1, 165b2 forming a pair in a vertical direction, so that the defocus amount can be obtained.

Figure 3:
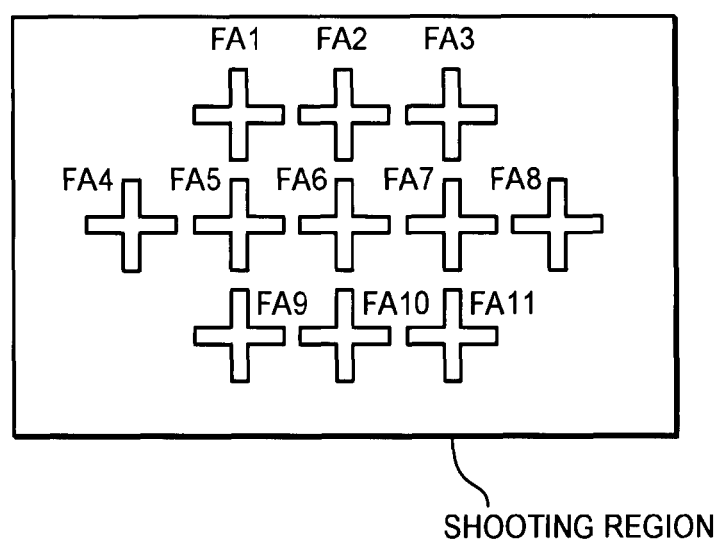
FIG. 3 is a map showing an area in which the AF sensor detects a defocus amount.

FIG. 3 is a map showing an area in which the AF sensor 16 detects the defocus amount. In a shooting region, eleven marks FA1 to FA11 indicate positions to detect the defocus amount. An integrating operation of the photoelectric conversion device 165, amplification of an output of the device, A/D conversion of the output, calculation of the defocus amount and the like are controlled by the focus detection circuit 17.

Figures 4, 5:
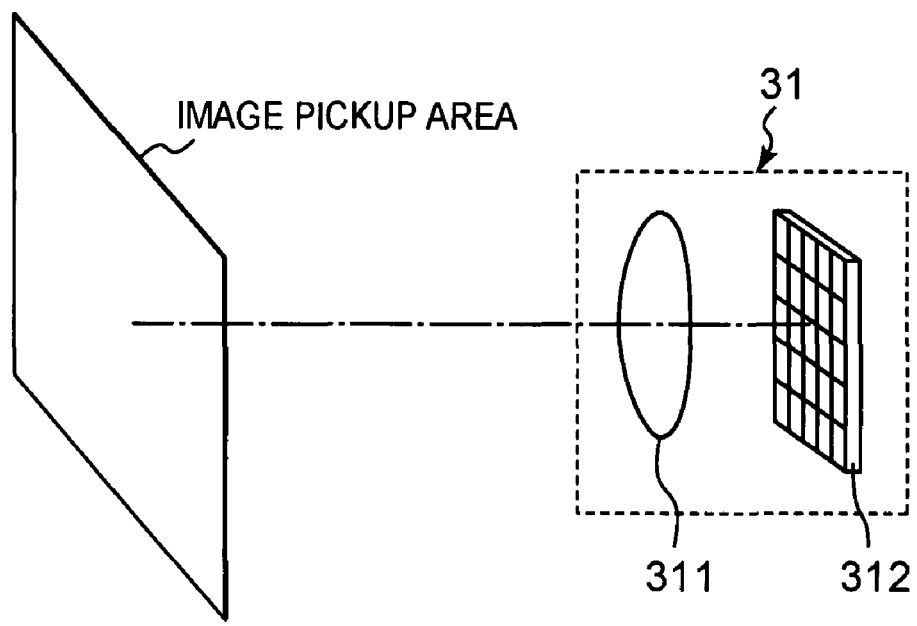
FIG. 4 is a schematic perspective view showing a constitution example of a light metering sensor.
FIG. 5 is an explanatory view showing a light metering area of a photodiode array.

FIGS. 4 and 5 show a constitution example of the light metering sensor 31. The light metering sensor 31 arranged at a subsequent stage of the penta prism 14 in the vicinity of the eyepiece lens 15 has a detection lens 311 and a photodiode array 312. The subject image formed on the focus mat 13 is formed on the two-dimensionally arranged photodiode array 312 via the penta prism 14 and the detection lens 311. As shown in FIG. 5, the photodiode array 312 formed of, for example, 7×7 segments corresponds to predetermined light metering areas EA1 to EA49 of a shooting area. An output of the photodiode array 312 is amplified and A/D converted in the light metering circuit 32.

Here, in the SLR camera of the present embodiment, as a finder mode (the observation mode) during shooting, it is possible to automatically/manually select an optical finder (OPT) mode which is the first observation mode to observe the subject image formed by the photographing lens 1 via the optical finder and an electronic finder (EVF) mode which is the second observation mode to acquire the subject image formed by the photographing lens 1 as the image data from the image pickup device 20 and observe the acquired image data via the liquid crystal monitor 64. An operation control example in the finder mode will hereinafter be described with reference to flow charts of FIGS. 6 to 11.

Figure 6:
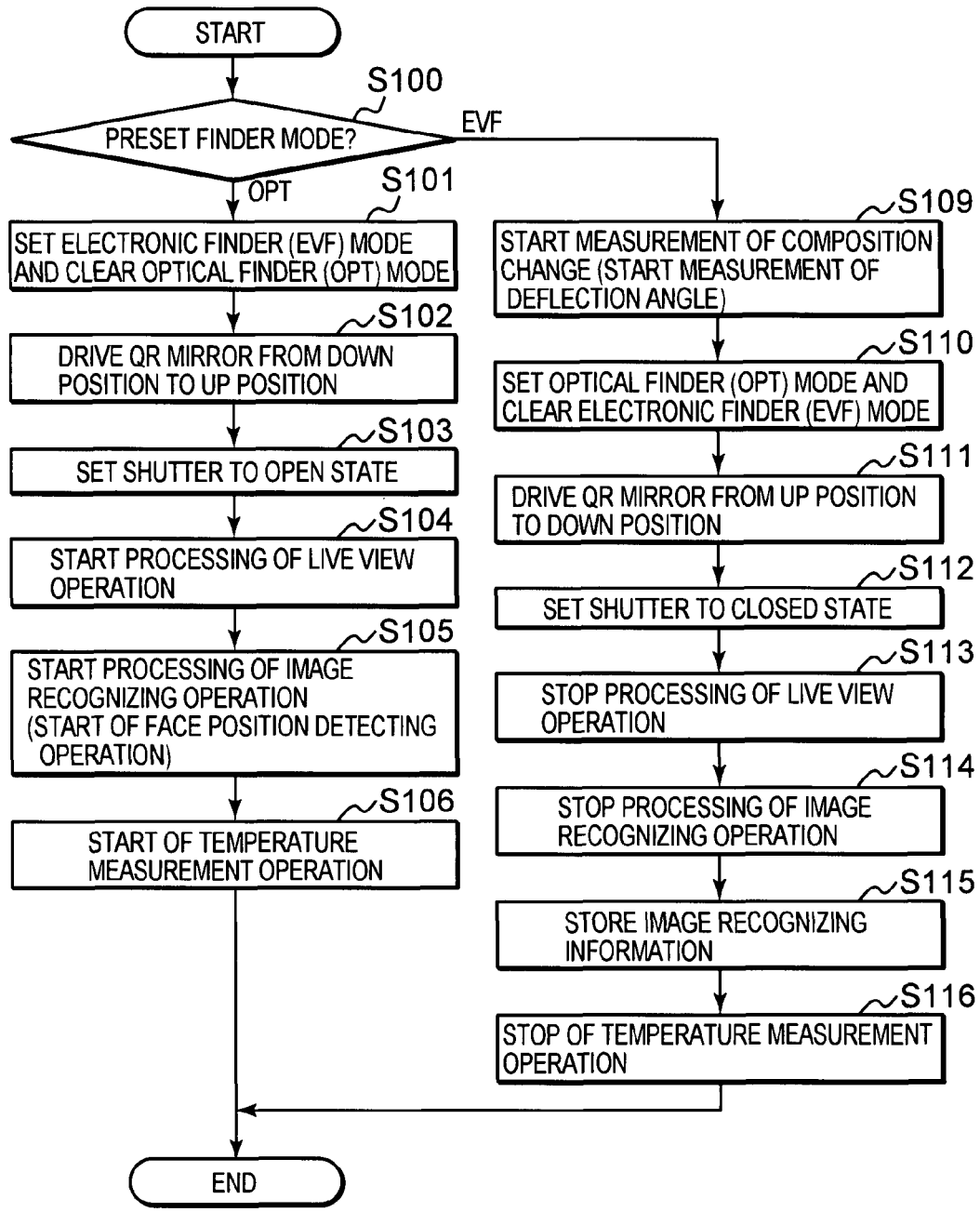
FIG. 6 is a flow chart showing an operation control example in a case where a finder mode selection SW is operated.

FIG. 6 is a flow chart showing an operation control example in a case where a finder mode selection SW of the operation SW 67 is operated as one operation control example to be executed by the CPU 51 of the system controller 50. A user operates the finder mode selection SW, so that the optical finder mode and the electronic finder mode can arbitrarily be selected. During the shooting with a lens having a large focal length, the camera easily vibrates. Therefore, it is preferable that the camera is securely held to observe the subject with the optical finder. In a case where it is difficult to perform the shooting while looking through the optical finder, the subject may be observed with the electronic finder.

In a case where the finder mode selection SW is operated, it is first judged whether the present finder mode is the optical finder (OPT) mode or the electronic finder (EVF) mode (step S100).

When the present finder mode is the optical finder (OPT) mode, the electronic finder (EVF) mode is set to clear the optical finder (OPT) mode (step S101). Then, the QR mirror 11 is driven from the down position to the up position (step S102), and the shutter 19 is set to an open state (step S103). In consequence, the subject image formed by the photographing lens 1 can be formed on the image pickup device 20, and the image data acquired by the image pickup device 20 is displayed in the liquid crystal monitor 64 according to the electronic finder (EVF) mode to start a live view operation (step S104).

In parallel with the start of the live view operation, an image recognizing operation (a face position detecting operation) is started (step S105). That is, during the live view operation, the CPU 51 controls the image recognition circuit 54 to execute a known image recognition algorithm in real time. In this processing, a subject characteristic point such as contour, eye, mouth or nose indicating a face feature is detected to acquire positional information of the subject and size information of the subject.

This image recognizing operation can be executed at all positions of the shooting area. On the other hand, as shown in FIG. 3, the AF sensor 16 cannot perform a focus detecting operation at all positions of the shooting area but can at fixed positions. However, it is preferable that an area where the image recognizing operation is performed is schematically matched with one of the detection areas of the AF sensor 16. This is because in a case where the finder mode is changed from the EVF mode to the OPT mode, the positional information of the subject detected by the image recognizing operation is to be used with correspondence to a detection position of the AF sensor 16.

Moreover, to indirectly detect a noise level of the image pickup device 20 (predict the noise level) in parallel with the start of the live view operation, a temperature measurement operation of the image pickup device 20 is started by the temperature sensor 81. During the live view operation, the temperature measurement operation is continued in a predetermined cycle (step S106). For example, interruption signals are generated at predetermined intervals by use of the timer counter 58. In synchronization with this interruption signal, the temperature of the image pickup device 20 is measured by the temperature sensor 81, and stored as temperature log data in, for example, the flash ROM 68.

On the other hand, in a case where it is judged in the step S100 that the present finder mode is the electronic finder (EVF) mode, measurement of a composition change (measurement of a deflection angle of the camera) is started in response to an output of the vibration detecting sensor (gyroscope) 83 (step S109). That is, based on the present position of the SLR camera, integration of the outputs of the vibration detecting sensor (gyroscope) 83 is started in order to measure the change of the composition accompanying the operation of the finder mode selection SW. Since the output of the vibration detecting sensor (gyroscope) 83 is proportional to an angular speed, the outputs are integrated for a predetermined time to obtain an angle at which an optical axis of the SLR camera deflects for a predetermined time. In consequence, a change amount of the composition generated for the predetermined time can be detected. Information on this change amount of the composition is used during succession of algorithm described later.

Then, the optical finder (OPT) mode is set, and the electronic finder (EVF) mode is cleared (step S110). Subsequently, the QR mirror 11 is driven from the up position to the down position (step S111), and the shutter 19 is set to the closed state (step S112). In consequence, the subject image formed by the photographing lens 1 can be formed on a focus mat 13 side, and the subject image can be observed via the optical finder according to the optical finder (OPT) mode. Then, stop processing of the live view operation is performed (step S113), and the image recognizing operation is also stopped (step S114).

Here, to switch the selection from the electronic finder (EVF) mode to the optical finder (OPT) mode, image recognizing information (subject information) acquired by the image recognizing operation just before in the electronic finder (EVF) mode is stored in one of the SDRAM 71, the flash ROM 68 and the RAM of the system controller (step S115). In this case, as the subject information acquired by the image recognizing operation, information such as the position of the subject, direction of the subject and size of the subject is recorded. Attribute information is also stored. The attribute information includes, for example, time (date) when the finder mode was switched, information (a fixed focus lens, a zoom lens, a macro lens, the focal length of the lens, brightness of the lens) of the photographing lens 1, operation mode information (a shooting mode, a continuous shooting mode, a blur correction mode) and the like. At least one of these pieces of information is recorded as the attribute information. These pieces of attribute information are used for judging whether or not the succession of the subject image is appropriate in the focus detecting operation or an exposure condition setting operation in the optical finder (OPT) mode as described later, and they are further used in correction of the subject information. Then, the measurement operation of the embodiment of the image pickup device 20 by the temperature sensor 81 is stopped (step S116).

Figure 7:
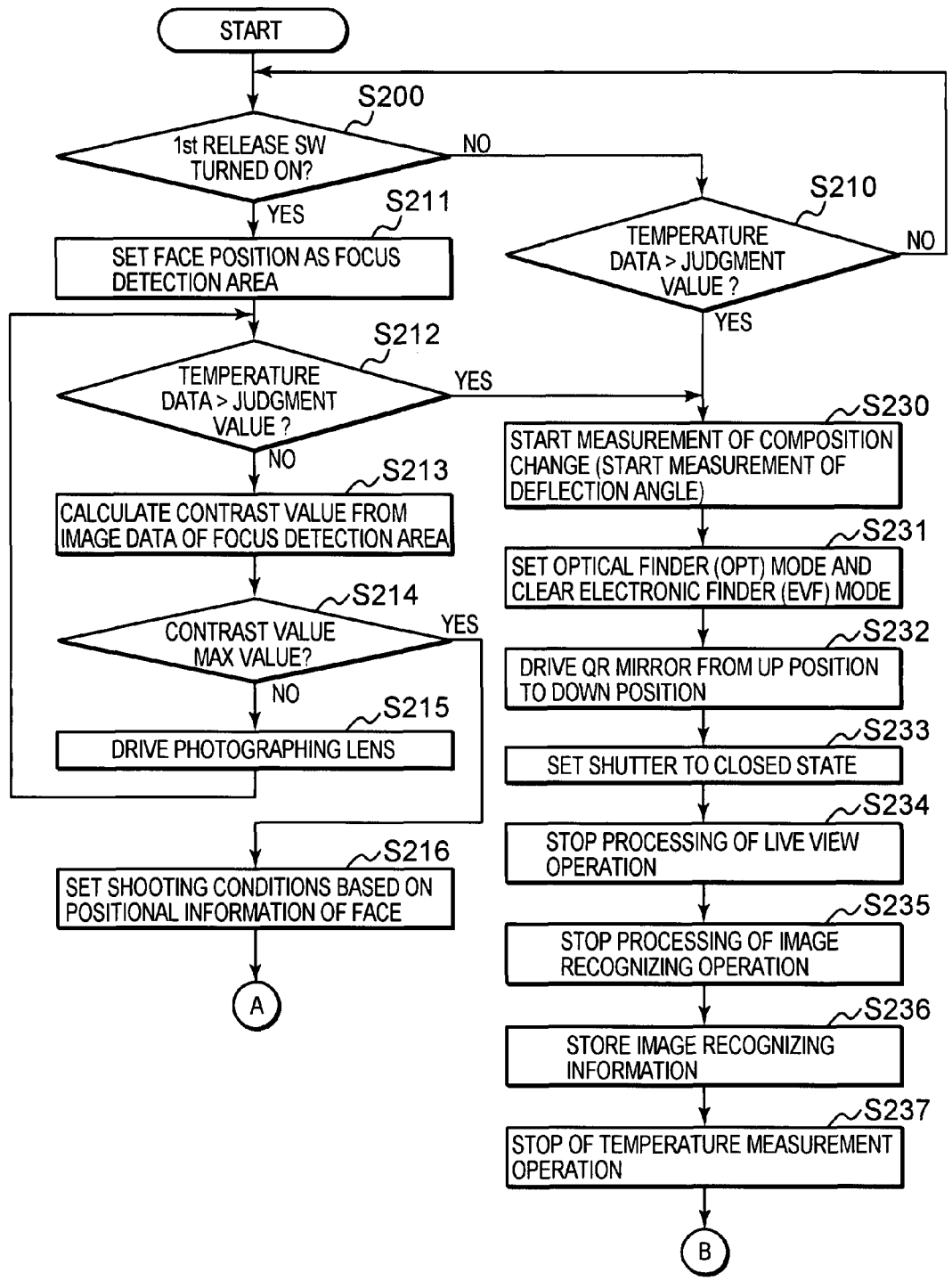
FIG. 7 is a flow chart showing a shooting operation control example during selection of an electronic finder (EVF) mode.
Figure 8:
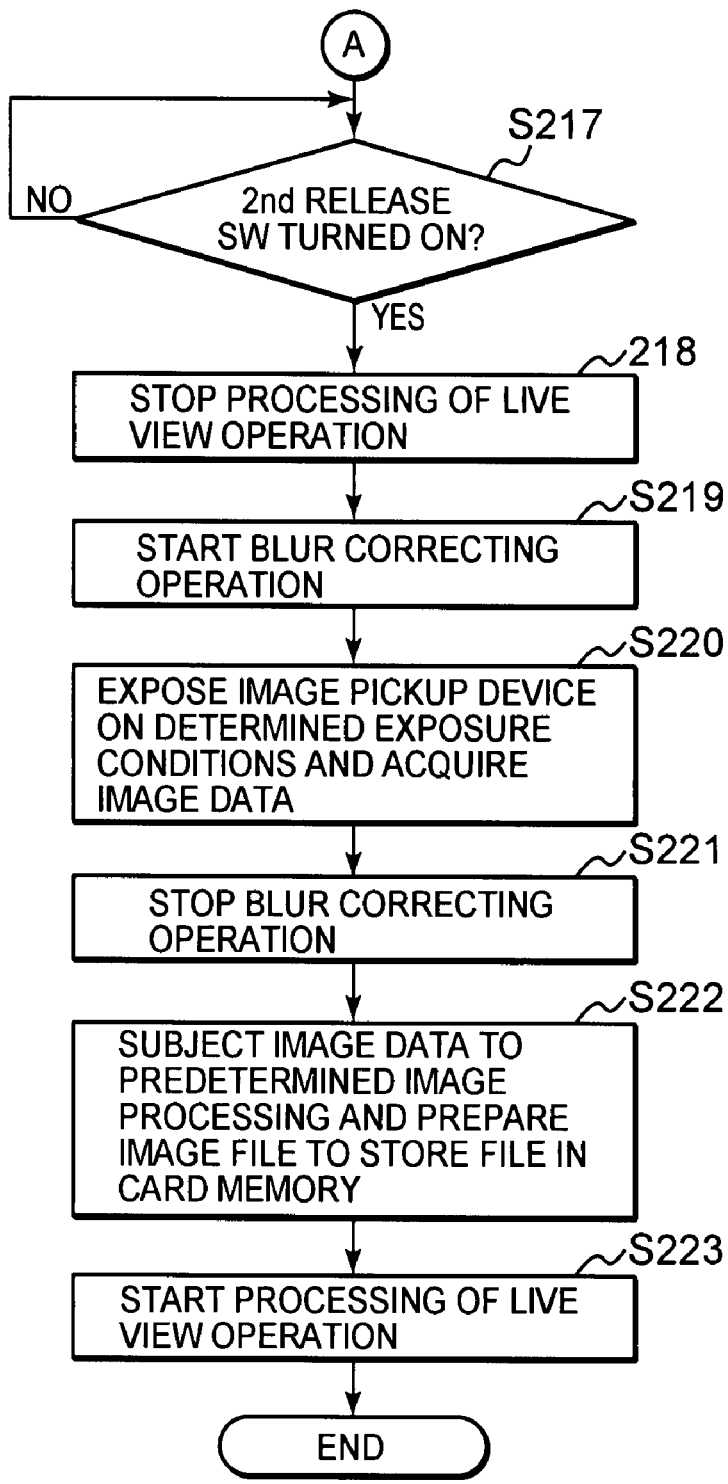
FIG. 8 is a flow chart continued from FIG. 7 and showing the shooting operation control example during the selection of the electronic finder (EVF) mode.

Subsequently, FIGS. 7 and 8 are flow charts showing a shooting operation control example during the selection of the electronic finder (EVF) mode as one operation control example to be executed by the CPU 51 of the system controller 50. First, it is judged whether or not a first release SW (not shown) of the operation SW 67 has been turned on (step S200). In a case where it is judged that the switch has not been turned on (step S200: No), it is judged whether or not temperature data of the image pickup device 20 detected by the temperature sensor 81 exceeds a preset judgment value (step S210). In a case where it is judged that the temperature data does not exceed the judgment value (step S210; No), the processing waits until the first release SW is turned on.

On the other hand, in a case where it is judged that the first release SW has been turned on (step S200; Yes), a face position (a subject position) extracted by image recognition processing is set as a focus detection area (step S211). Then, it is judged whether or not the temperature data of the image pickup device 20 detected by the temperature sensor 81 exceeds the preset judgment value (step S212). In a case where it is judged that the temperature data does not exceed the judgment value (step S212; No), a contrast value is calculated from the image data of the set focus detection area (step S213). It is judged whether or not the calculated contrast value is a maximum value (step S214). In a case where it is judged that the value is not the maximum value (step S214: No), the photographing lens 1 is driven until the subject position is brought into a focused state and the contrast value reaches the maximum value (step S215).

The processing of these steps S213 to S215 is executed as a focusing operation of the contrast system. Then, luminance data is acquired from the image data in the focused state to set shooting conditions (aperture, shutter speed, color correction, γ correction, etc.) so that the face position (the subject position) has appropriate exposure conditions, whereby the shooting can be performed (step S216). The processing of these steps S213 to S216 is executed as a function of a second shooting condition setting section.

Then, the processing waits until a second release SW is turned on (step S217). In a case where it is judged that the second release SW is turned on (step S217: Yes), the live view operation is stopped (step S218), and further a blur correcting operation is started using an output of the vibration detecting sensor (gyroscope) 83 (step S219). Then, the image pickup device 20 is exposed on determined exposure conditions to acquire the image data (step S220). When the image data is acquired, the blur correcting operation is stopped (step S221). Moreover, after subjecting the acquired image data to predetermined image processing in the image processing circuit 52, an image file is prepared and stored in the memory card 70 (step S222). Then, the start processing of the live view operation is performed to return to the live view operation (step S223).

On the other hand, during the selection of the electronic finder (EVF) mode, in a case where it is judged in the judgment processing of the step S210 or S212 that the temperature data of the image pickup device 20 exceeds the judgment value (step S210; Yes or step S212; Yes), processing is executed to forcibly switch the selection from the electronic finder (EVF) mode to the optical finder (OPT) mode. This processing shown in steps S230 to S237 are similar to that of the steps S109 to S116.

That is, the imaging apparatus automatically switches the electronic finder mode to the optical finder mode based on the temperature data of the image pickup device. It can be prevented by this operation that noises of the obtained image data increase and that image quality deteriorates. It can be prevented that the image pickup device is operated in a state in which limitation of an operation temperature of the image pickup device is exceeded.

First, in response to the output of the vibration detecting sensor (gyroscope) 83, the measurement of the composition change (the measurement of the deflection angle) is started (step S230). Then, the optical finder (OPT) mode is forcibly set, and the electronic finder (EVF) mode is cleared (step S231). Then, the QR mirror 11 is driven from the up position to the down position (step S232), and the shutter 19 is set to the closed state (step S233). In consequence, the subject image formed by the photographing lens 1 can be formed on the focus mat 13 side, and the subject image can be observed via the optical finder according to the optical finder (OPT) mode. Then, the stop processing of the live view operation is performed (step S234), and the image recognizing operation is also stopped (step S235).

Here, to forcibly switch the selection from the electronic finder (EVF) mode to the optical finder (OPT) mode, the image recognizing information (the subject information) acquired by the image recognizing operation just before in the electronic finder (EVF) mode is stored in one of the SDRAM 71, the flash ROM 68 and the system controller (step S236). In this case, the attribute information is also stored together with the subject information acquired by the image recognizing operation. Then, the measurement operation of the temperature of the image pickup device 20 by the temperature sensor 81 is also stopped (step S237).

It is to be noted that in case of the forced switch of the selection from the electronic finder (EVF) mode to the optical finder (OPT) mode, since the switch is not intended by a camera user, a warning of mode change needs to be displayed in the liquid crystal monitor 64. It is not preferable that this warning is suddenly displayed during the mode change. It is preferable that necessity for the mode change is predicted based on a degree of temperature rise of the image pickup device 20 detected by the temperature sensor 81, to start the display of the warning in advance. For example, the display of the warning may be started ten seconds before performing a mode change operation, and a time required from a time when the warning is displayed to a time when the mode change is actually started may be displayed in a countdown form.

Figure 9:
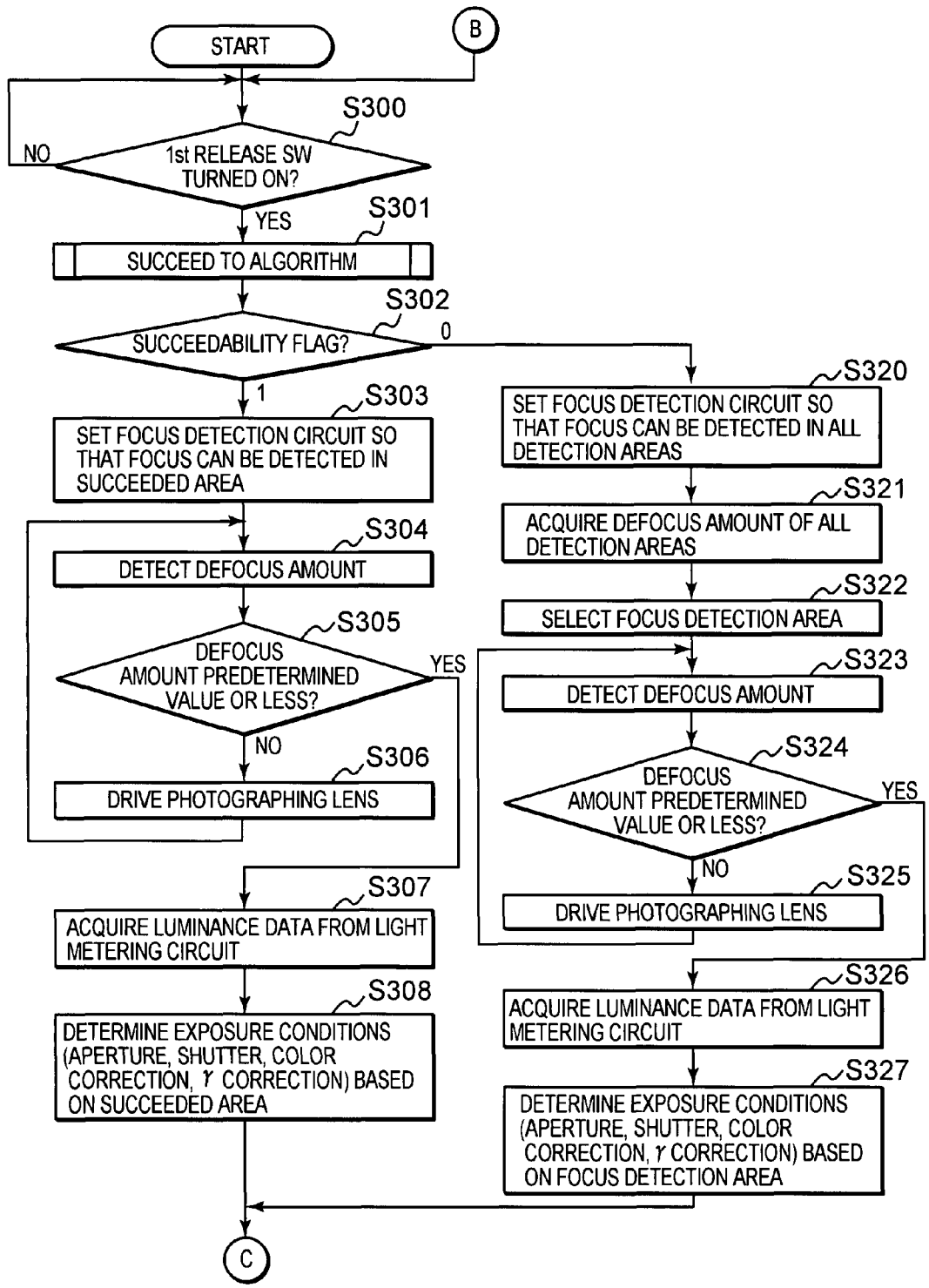
FIG. 9 is a flow chart showing a shooting operation control example during selection of an optical finder (OPT) mode.
Figure 10:
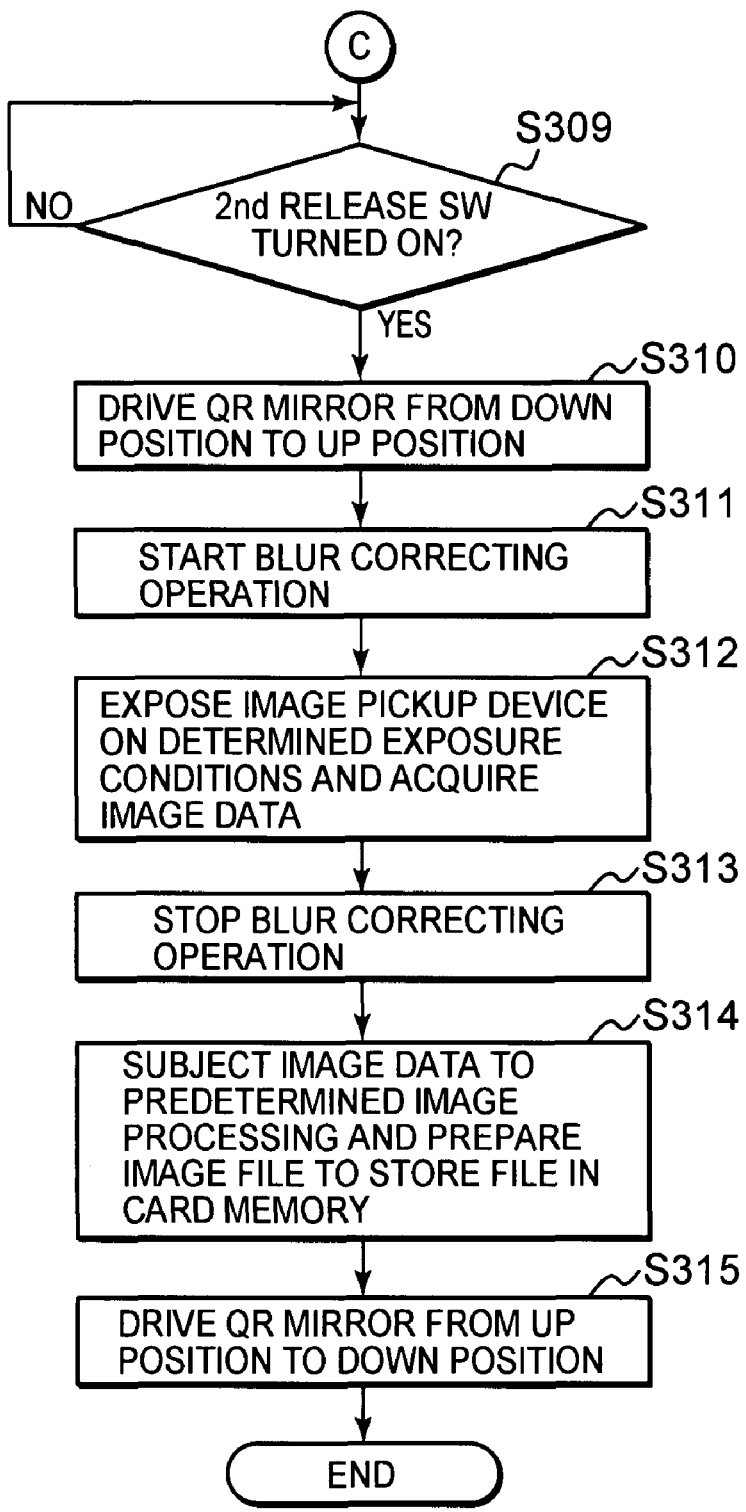
FIG. 10 is a flow chart continued from FIG. 9 and showing the shooting operation control example during the selection of the optical finder (OPT) mode.

Moreover, FIGS. 9 and 10 are flow charts showing a shooting operation control example during the selection of the optical finder (OPT) mode as one operation control example to be executed by the CPU 51 of the system controller 50. First, it is judged whether or not the first release SW (not shown) of the operation SW 67 has been turned on (step S300). In a case where it is judged that the switch has not been turned on (step S300; No), the processing waits until the first release SW is turned on.

When the first release SW is turned on, algorithm succession (inheritance) processing is performed to judge whether or not the succession of information on the subject acquired just before in the electronic finder (EVF) mode is appropriate (step S301). This algorithm succession processing will be described with reference to a sub-routine shown in FIG. 11.

First, image recognizing information (including the attribute information) stored in the step S115 or S236 is read (step S400), and it is judged whether or not the image recognizing information has reliability (step S401). That is, it is judged based on the attribute information stored together with the image recognizing information whether or not the stored image recognizing information (the information on the subject) can be used in the present optical finder (OPT) mode. For example, in a case where a time stored as the attribute information deviates as much as a predetermined value or more from the present time, it is judged that the image recognizing information cannot be used and should not be succeeded. In a case where the operation mode stored as the attribute information is different from the present operation mode, it is judged the image recognizing information cannot be used and should not be succeeded. Furthermore, in a case where a type of the photographing lens 1 stored as the attribute information is different from that of the presently mounted photographing lens 1, it is judged the image recognizing information cannot be used and should not be succeeded. The processing of the step S401 is executed as a function of a succession appropriateness judgment section by the CPU 51.

The image recognizing information (the person position, a size of the person) recognized from the image data of the image pickup device in the electronic finder (EVF) mode has a high reliability. However, the information cannot necessarily be used in the optical finder (OPT) mode. Immediately after the switching of the finder mode, the shooting operation is not performed. In a case where a camera use environment and use conditions of the camera change after the finder mode has been switched, the image recognizing information cannot be used. That is, the image recognizing information is prevented from being incorrectly used by use of the attribute information stored together with the image recognizing information.

In a case where it is judged that the image recognizing information does not have any reliability (step S401; No), a succeedability flag is cleared (step S411), whereby it is assumed that the image recognizing information cannot be used and should not be succeeded.

On the other hand, in a case where it is judged based on the attribute information that the image recognizing information has the reliability (step S401; Yes), it is judged based on an output of a fixing detection sensor whether or not the camera body is fixed (step S4010). In a case where it is detected that the camera body is mounted on a fixing device, a composition does not change even with the change of the finder mode. Therefore, in a case where it is judged that the body is mounted on the fixing device (step S402; Yes), an operation of correcting the composition change (S402, S403 and S404) is not executed. In a case where it is judged that the body is not mounted on the fixing device (step S403; No), a change amount (a camera deflection angle θ) of the composition is calculated from an integral value of the output of the vibration detecting sensor (gyroscope) 83 (step S402), and it is judged whether or not the image recognizing information (the position) can be corrected (step S403). This processing is executed, because a user's camera holding state differs depending on the finder modes. That is, in the electronic finder (EVF) mode, the user holds the camera away from the user's face in order to shoot the image while looking at the liquid crystal monitor 64. On the other hand, in the optical finder (OPT) mode, the user necessarily holds the camera close to the user's face in order to shoot the image while looking into the optical finder. Therefore, depending on the camera holding state accompanying the change of the finder modes, the camera may vibrate, and change can be generated in the composition. The change of the composition generates change of the subject position based on the shooting area.

Figure 12:
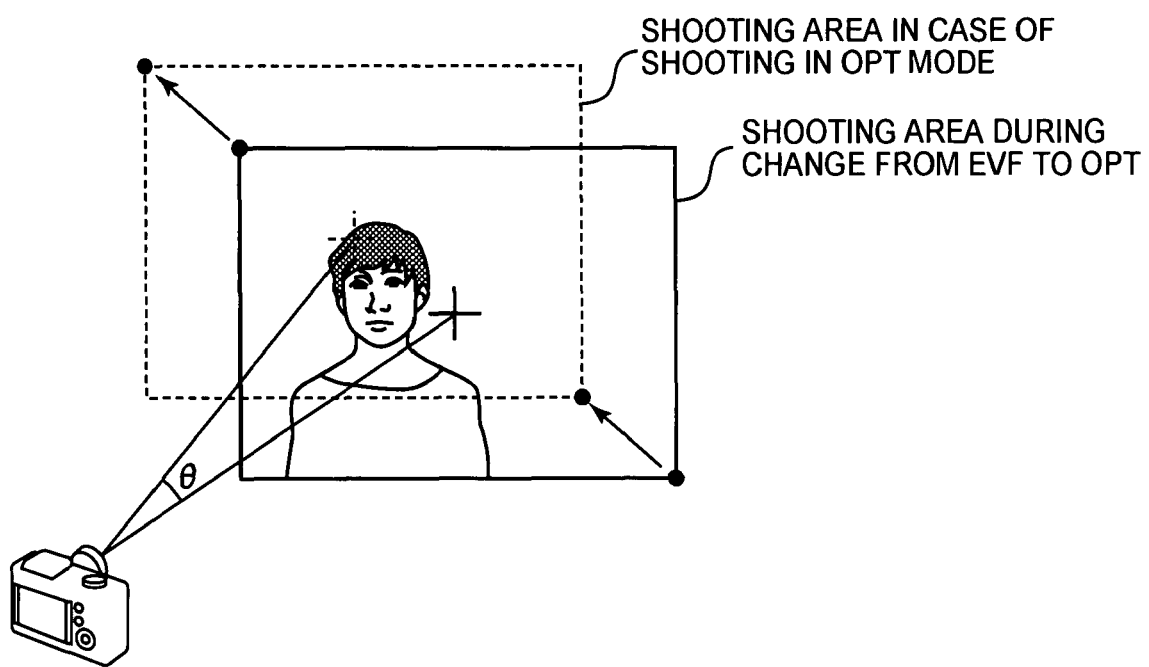
FIG. 12 is an explanatory view schematically showing behavior of change of composition accompanying change of a finder mode.

For example, FIG. 12 is an explanatory view schematically showing behavior of the change of the composition accompanying the change of the finder modes. In the drawings, a solid line shows a shooting area immediately before the electronic finder (EVF) mode changes to the optical finder (OPT) mode, and a broken line shows a shooting area at a time when the user starts observation in the optical finder (OPT) mode. Here, the deflection amount θ of the SLR camera (the change amount of the composition) can be detected by integrating the outputs of the vibration detecting sensor (gyroscope) 83. When the deflection amount θ exceeds a predetermined value, the position of the subject immediately before detected by the image recognition goes out of the shooting area, and the subject positional information obtained by the image recognition cannot be used. To solve the problem, in the processing of the steps S402, S403, the change amount of the composition (the deflection angle θ) accompanying the switching of the finder mode is calculated. When this deflection angle θ exceeds the predetermined value, it is judged that the position of the image recognizing information cannot be corrected and that the information should not be succeeded (step S403; No), and the succeedability flag is cleared (step S411).

On the other hand, in a case where the deflection angle θ is the predetermined value or less and the image recognizing information can be corrected (step S403; Yes), the face positional information is corrected based on the deflection angle θ (step S404). In consequence, the subject positional information (the face positional information) to be succeeded is corrected based on the detected change amount of the composition.

According to the processing of the steps S402 and S403, the image recognizing information (positional data of the person) recognized in the electronic finder (EVF) mode is correctly succeeded (inherited) in the optical finder (OPT) mode. So, the image recognizing information can be accurately succeeded.

Then, focal length information f of the photographing lens 1 is acquired (step S405), and it is judged whether or not the image recognizing information (the size) can be corrected (step S406). This processing is executed because the user might zoom the photographing lens 1 after changing the finder modes. That is, when a focal length of the photographing lens 1 changes during the zooming, the size of the subject with respect to the shooting area changes. When the lens focal length is extended by the zooming, shooting magnification increases, and the size of the subject with respect to the shooting area increases. When the size excessively increases, the subject may locate out of the shooting area. In such a situation, the subject size information obtained from the image recognized just before cannot be used, and should not be succeeded.

Conversely, when the lens focal length is reduced by the zooming, the shooting magnification decreases, and the size of the subject with respect to the shooting area decreases. In other words, an angle of view enlarges, and a new subject might enter the shooting area. In such a situation, it is not necessarily appropriate to set the exposure conditions to the only subject having the image thereof recognized just before. Therefore, even in this case, the subject size information obtained from the image recognized just before cannot be used, and should not be succeeded.

To solve the problem, according to the processing of the steps S405, S406, it is judged from the change of the focal length information f during the switching of the finder mode whether or not the size of the image recognizing information can be corrected. In a case where it is judged that the size correction cannot be performed, it is judged that the information should not be succeeded (step S406; No), and the succeedability flag is cleared (step S411). On the other hand, in a case where it is judged that the size correction can be performed (step S406; Yes), the face size information is corrected based on the focal length information f (step S407).

According to the processing of the steps S405 to S407, the image recognizing information (the size data of the person) recognized in the electronic finder (EVF) mode is correctly succeeded (inherited) by the optical finder (OPT) mode. So, the correct image recognizing information is accurately succeeded.

Afterward, based on the corrected information of the position and the size of the face, a focus detection area in the AF sensor 16 of the phase difference system is selected (step S408). Similarly, the light metering area in the light metering sensor 31 is selected based on the corrected information of the position and the size of the face (step S409), and the succeedability flag is set (step S410).

Figure 13A:
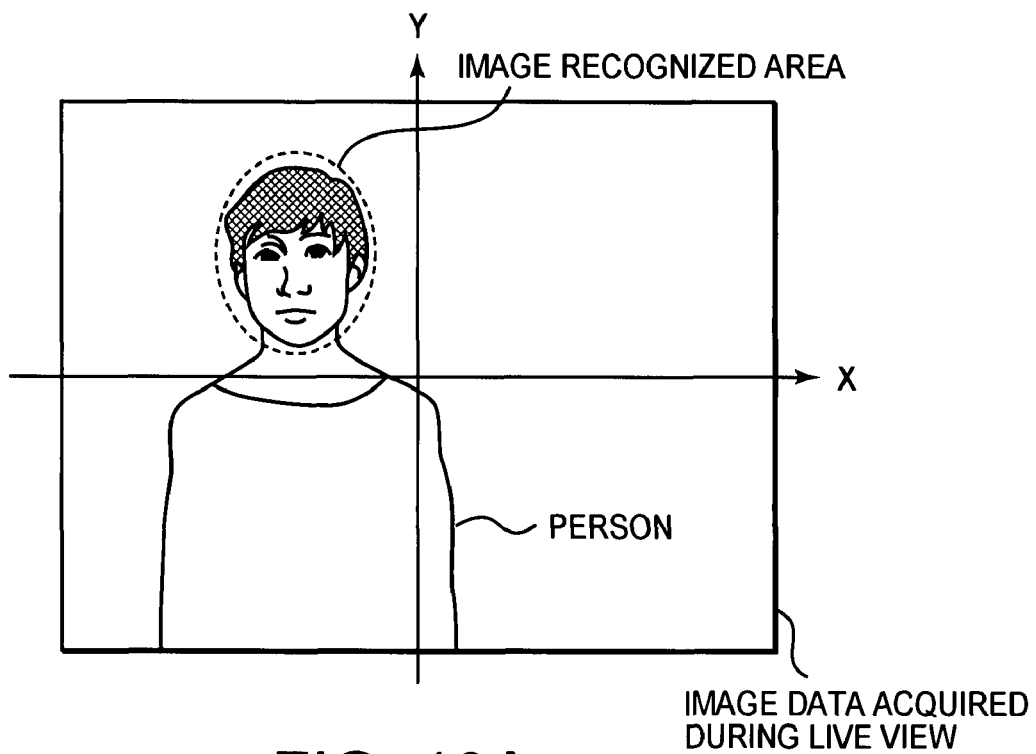
FIG. 13A is an explanatory view showing an image data example acquired during the selection of the electronic finder (EVF) mode.

The processing of the steps S408, S409 will be described with reference to FIGS. 13A to 13C. FIG. 13A shows an image data example acquired from the image pickup device 20 during the selection of the electronic finder (EVF) mode (during the live view operation). It is supposed that the face of the person as the subject is present in this image data. The CPU 51 detects an area in which the face is present from the characteristic point by use of the image recognition circuit 54 as shown by a broken line. Then, the size and the position of the detected face area are determined (an imaginary coordinate axis (X, Y) may be set to the center of the area in which the image is acquired, to define the position).

Figure 13B:
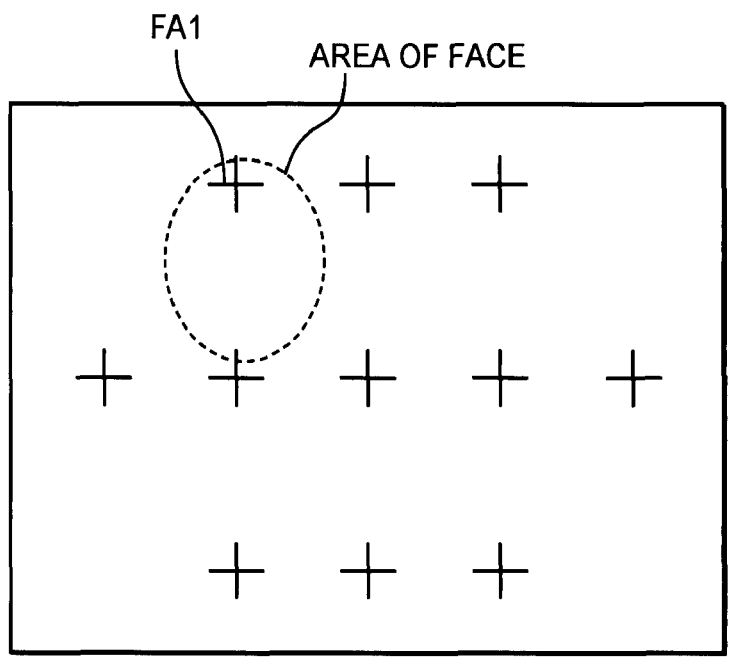
FIG. 13B is an explanatory view showing a selection example of a focus detection area.

Then, in the step S408, as shown in FIG. 13B, for example, FA1 is selected as the focus detection area of the AF sensor 16 based on the information of the size and the position of the detected face area. The CPU 51 acquires the defocus amount corresponding to this focus detection area FA1 to perform a focusing operation. It is to be noted that in a case where the area selected by the size and the position of the detected face area extends over a plurality of focus detection areas of the AF sensor 16, for example, the focus detection area nearer to the center of the areas may be selected to select one focus detection area. Conversely, in a case where the focus detection area corresponding to the size and the position of the detected face is not present, the focus detection area closest to the position of the face may be selected. Since such a selection method is employed, the image recognizing information can effectively be used.

Figure 13C:
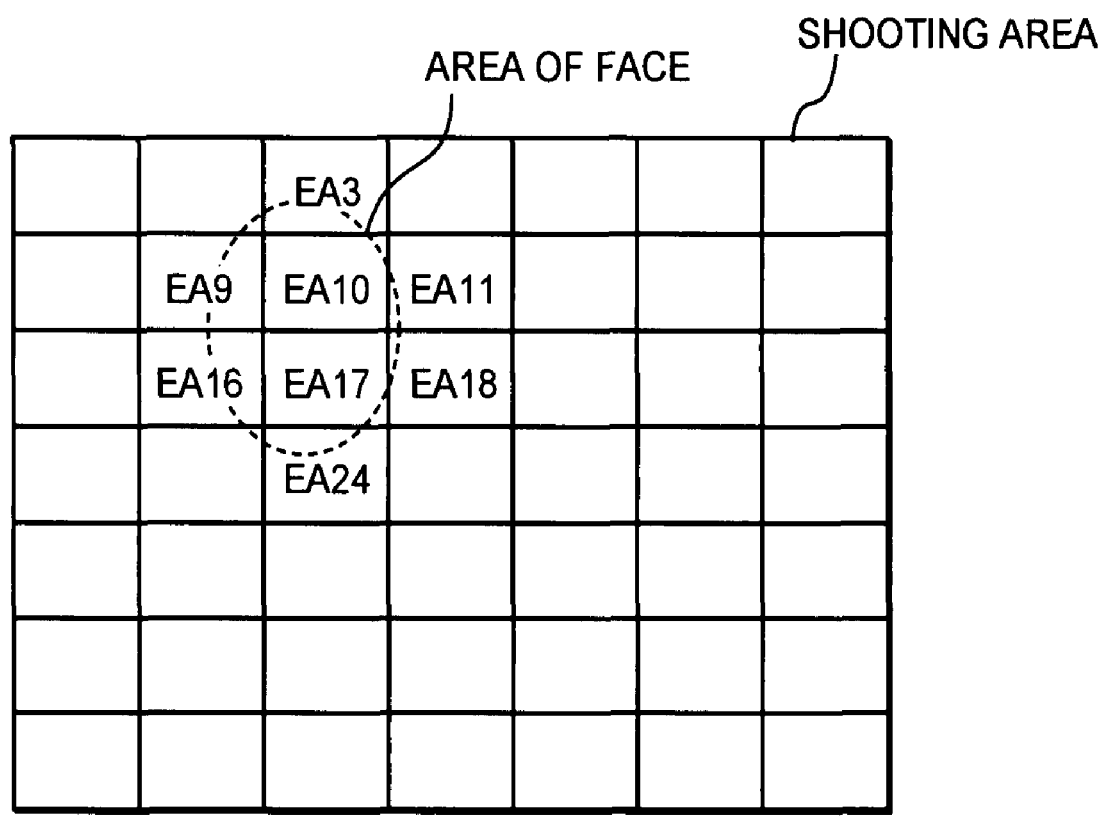
FIG. 13C is an explanatory view showing a selection example of a light metering area.

Then, in the step S409, as shown in FIG. 13C, for example, EA3, EA9, EA10, EA11, EA16, EA17, EA18, EA19 and EA24 are selected as light metering areas of the light metering sensor 31 based on the information of the size and the position of the detected face area. The CPU 51 multiples, for example, an output of the photodiode array 312 by a weighing coefficient for each light metering area, obtains an average value, and determines the shooting conditions based on the average value. To obtain the average value, the weighing coefficient to be applied to the selected light metering area is set to be larger than that with respect to the light metering area which is not selected. According to such an operation, the recognized area can be shot on appropriate shooting conditions.

Figure 11:
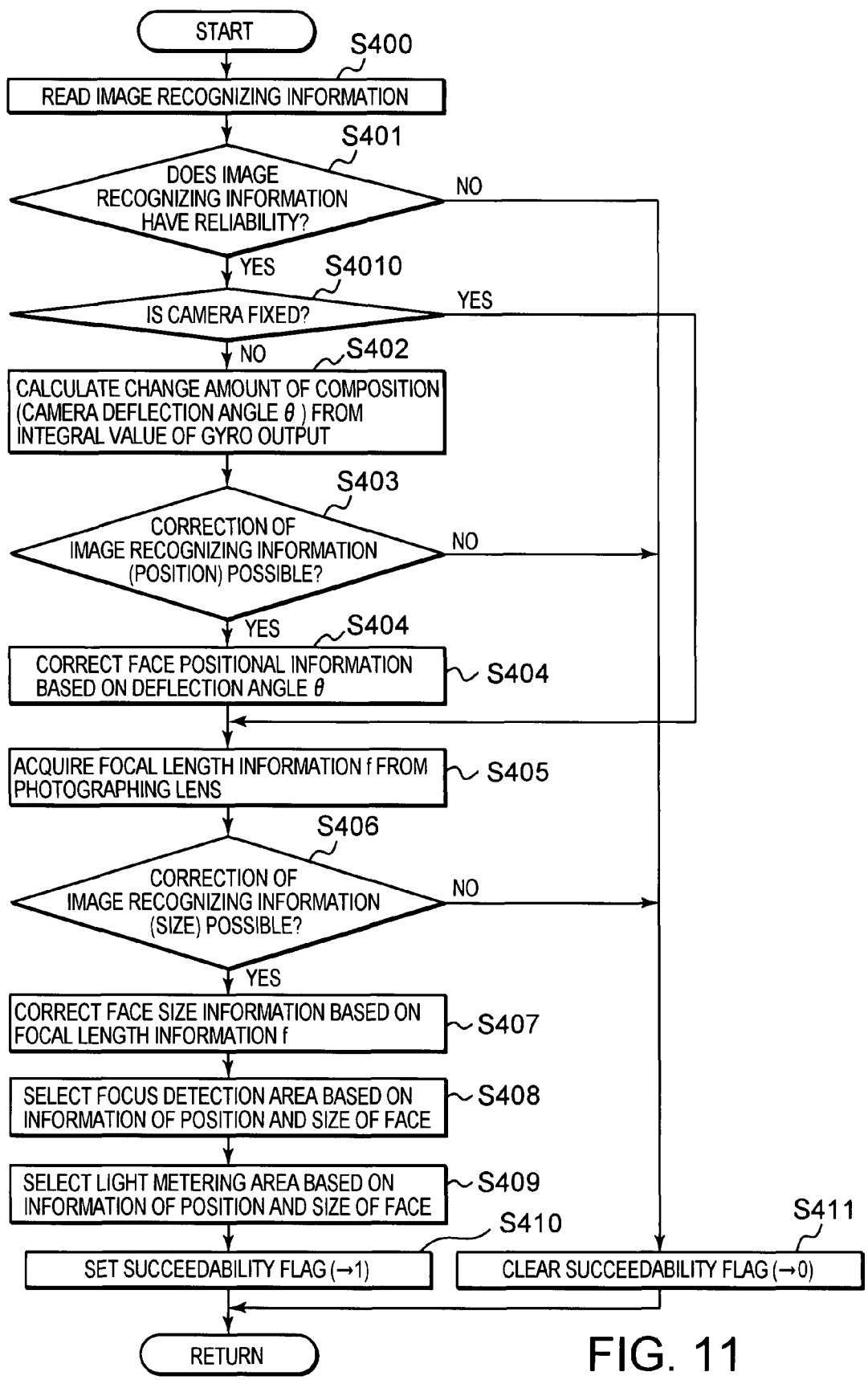
FIG. 11 is a flow chart showing a sub-routine of an algorithm succession processing example.

In the algorithm succession processing of FIG. 11, it is judged whether or not the image recognizing information recognized in the electronic finder mode by use of the following information can be succeeded by the optical finder mode. The image recognizing information is further corrected. However, the method shown in FIG. 11 is merely one example.

The algorithm succession processing may be performed using at least one of these pieces of information. Some pieces of information may be selected and arbitrarily be combined to perform the algorithm succession processing:

1) attribute information;
2) information indicating whether or not the shooting device is fixed; and
3) information for detecting the vibration of the shooting device.

Next, returning to FIG. 9, shooting operation control during the selection of the optical finder (OPT) mode will be described. As a result of the algorithm succession processing in the step S301, it is judged whether or not the succeedability flag is set (step S302). When the succeedability flag is set (the flag is 1) in the step S410, the focus detection circuit 17 is set so that focus detection can be performed in the focus detection area selected as the succeeded focus detection area in the step S408 (step S303). Then, the defocus amount is detected in the succeeded focus detection area as a target based on an output of the AF sensor 16 of the phase difference system (step S304), and control is performed so as to perform the focusing operation for driving the photographing lens 1 until the focused state is obtained so that the detected defocus amount is the predetermined value or less (steps S305, S306).

When the photographing lens 1 is controlled into the focused state (step S305; Yes), the luminance data is acquired from the light metering circuit 32 (step S307), and the light metering area selected in the step S409 is obtained as the light metering area to determine exposure conditions (acquisition conditions of the image data) such as the aperture, shutter speed, color correction and γ correction so that the light metering area has appropriate exposure conditions (step S308). The processing of these steps S303 to S308 is executed as a function of the first shooting condition setting section during the succession.

That is, the focus detecting operation of the phase difference system is performed using the person position detected in the electronic finder (EVF) mode. According to this operation, the subject desired by the user can quickly be focused.

As compared with a case where the focusing operation is performed using the only AF sensor 16 of the phase difference system, probability that the user's desired subject is focused is high.

Then, the light metering area is determined using the person position detected in the electronic finder (EVF) mode. Therefore, the user's desired subject can be shot on the appropriate exposure conditions. As compared with a case where the exposure conditions are set using the only light metering circuit 32, probability that the exposure conditions are matched with the user's desired subject is high.

When the photographing lens 1 is controlled into the focused state and the exposure conditions are set, the operation shifts to the shooting operation. First, the processing waits until the second release SW is turned on (step S309). In a case where it is judged that the second release SW is turned on (step S309; Yes), the QR mirror 11 is driven from the down position to the up position (step S310), and the blur correcting operation is started using the output of the vibration detecting sensor (gyroscope) 83 (step S311). Then, the image pickup device 20 is exposed on the determined exposure conditions, and the image data is acquired (step S312). When the image data is acquired, the blur correcting operation is stopped (step S313), the acquired image data is subjected to predetermined image processing in the image processing circuit 52, and then the image file is prepared and stored in the memory card 70 (step S314). After the shooting, the QR mirror 11 is driven from the up position to the down position (step S315), and the processing is returned to a standby state in the optical finder (OPT) mode.

On the other hand, as a result of the algorithm succession processing of the step S301, in a case where it is judged in the step S302 that the succeedability flag has not been set (when the succeedability flag is cleared in the step S411), the subject information acquired just before in the electronic finder (EVF) mode cannot be used. Therefore, the processing is performed as usual in the optical finder (OPT) mode.

First, the focus detection circuit 17 is set so that the focus can be detected in all the detection areas (FA1 to FA11) of the AF sensor 16 (step S320). Then, the defocus amount is detected from all the focus detection areas as targets based on the output of the AF sensor 16 (step S321), and one focus detection area is selected from the areas (step S322). For example, the focus detection area positioned at the center of the shooting region is selected. Then, the control is executed so as to perform the focusing operation of driving the photographing lens 1 until the focused state is obtained in which the defocus amount of the selected focus detection area is the predetermined value or less (steps S323 to S325).

When the photographing lens 1 is controlled into the focused state (step S324; Yes), the luminance data is acquired from the light metering circuit 32 (step S326), and exposure conditions such as the aperture, the shutter speed, the color correction and the γ correction are determined so that the light metering area corresponding to the focus detection area selected in the step S322 has the appropriate exposure conditions (step S327). The processing of these steps S320 to S327 is executed as the function of the first shooting condition setting section at a usual time when the succession is not involved. When the photographing lens 1 is controlled into the focused state and the exposure conditions are set, the operation shifts to the shooting operation in the same manner as in the steps S309 to S315.

As described above, the SLR camera of the present embodiment includes the temperature sensor 81 and the like which indirectly detect the noise level of the image pickup device 20 based on the temperature. Then, in a case where it is indirectly detected through the temperature sensor 81 during the selection of the electronic finder (EVF) mode that the noise level of the image pickup device 20 exceeds the predetermined value, the selection is forcibly switched to the optical finder (OPT) mode. Therefore, the noise increase of the image pickup device 20 due to the continuation of the electronic finder (EVF) mode can be prevented to prevent deterioration of the image data obtained by the image pickup device 20.

Moreover, during such switching of the selection of the finder mode, the setting of the exposure conditions is controlled so that the information of the subject position recognized in the electronic finder (EVF) mode is succeeded and the subject position has the appropriate exposure conditions. Furthermore, the detection area is selected based on the succeeded subject position to control the focusing operation of the phase difference system. Therefore, in a case where the selection is switched from the electronic finder (EVF) mode to the optical finder (OPT) mode, the information on the subject acquired just before in the electronic finder (EVF) mode can effectively be used, burdens of the setting of the exposure conditions and the focusing operation can be reduced, and the processing can be performed in a short time.

It is to be noted that in the present embodiment, when the temperature of the image pickup device 20 rises, the noise level increases, and the image data deteriorates. Therefore, the temperature sensor 81 or the like is used as a section which indirectly detects the noise level of the image pickup device 20 (a section which predicts the noise level). Then, when the detected temperature exceeds the predetermined value, the selection is forcibly switched from the electronic finder (EVF) mode to the optical finder (OPT) mode, whereby the deterioration of the image data obtained by the image pickup device 20 is prevented. The present invention is not limited to a method of using the temperature sensor 81 as the detecting section for performing such automatic switching of the finder mode. It is preferable to directly detect the noise level of the image pickup device 20, and strictly to say, it is preferable that the effective pixels for actually acquiring the image data are shielded to detect the noise level from the pixels. However, when the effective pixels are shielded during the live view operation, the image displayed in the liquid crystal monitor 64 is discontinued. Therefore, as a realistic method, an optical black pixel (the OB pixel) of the image pickup device 20 of the CCD or the like is used, and an output level of this optical black pixel may be monitored. That is, it is judged whether or not the noise level exceeds the predetermined value at the output level of the optical black pixel. In a case where it is judged that the level exceeds the predetermined value, the selection may forcibly be switched from the electronic finder (EVF) mode to the optical finder (OPT) mode.

Moreover, in the present embodiment, the subject information acquired during the live view operation in the electronic finder (EVF) mode is succeeded by and reflected in the focus detecting operation and the light metering operation of the phase difference system executed during the shifting to the optical finder (OPT) mode, but the information can be applied to reverse mode change. That is, the subject information obtained by the focus detecting operation and the light metering operation of the phase difference system executed during the selection of the optical finder (OPT) mode may be succeeded by and reflected in the recognition processing of the subject during the live view operation in the electronic finder (EVF) mode. The precision of the subject positional information obtained from the AF sensor 16 and the light metering circuit 32 of the phase difference system drops as compared with a method in which the characteristic point of the subject is extracted from the image data to specify the position of the point. However, the processing required for executing the image recognition algorithm to extract the characteristic point of the subject imposes burdens on hardware and software. Therefore, even when the precision rather drops, approximate subject positional information obtained from the AF sensor 16 and the light metering circuit 32 of the known phase difference system is succeeded and reflected, whereby a time for the execution of the image recognition algorithm can be reduced and the burdens can be reduced as compared with a case where all the areas are regarded as the targets from the beginning.

In the above-mentioned embodiment, the operation SW 67 (the finder mode selection SW) is a selection switch for the user to select the observation mode, and may be referred to as a switching section which switches the observation mode. Moreover, the CPU 51 switches the observation mode from the electronic finder (EVF) mode to the optical finder (OPT) mode in a case where the temperature of the image pickup device 20 detected by the temperature sensor 81 exceeds the predetermined value, and may therefore be referred to as the switching section.

Since the noise level of the image pickup device 20 can be estimated from the output of the temperature sensor 81, the sensor may be referred to as a detecting section which detects the noise level of the image pickup device. Since the image pickup device interface circuit 72 and the CPU 51 and the image processing circuit 52 of the system controller 50 can be configured to detect the noise level of the image pickup device 20 based on the output of the optical black pixel of the image pickup device 20, they may be referred to as the detecting section.

Since the image recognition circuit 54 detects the person position based on the image data from the image pickup device 20 to detect the person during the observation in the electronic finder (EVF) mode, the circuit may be referred to as a recognizing section.

Since the processing of the steps S303 to S308 sets the shooting conditions during the observation in the optical finder (OPT) mode, the CPU 51 may be referred to as a first shooting condition setting section. Since the processing of the steps S213 to S216 sets the shooting conditions so as to appropriately shoot the person recognized by the image recognition circuit 54 during the observation in the electronic finder (EVF) mode, the CPU 51 may be referred to as a second shooting condition setting section. Needless to say, the CPU 51 is also a control section which controls the whole apparatus.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A single lens reflex type electronic imaging apparatus which is selectively operable in a first observation mode in which a subject image can optically be observed via an optical finder and a second observation mode in which the subject image is obtained as image data from an image pickup device and is displayed in a monitor for observation, the apparatus comprising:

a detecting section which detects a noise level of the image pickup device;

a first focusing section which focuses a subject during observation in the first observation mode;

a recognizing section which recognizes a person position based on the image data from the image pickup device during observation in the second observation mode to store the person position together with attribute information;

a second focusing section which focuses the person position recognized by the recognizing section during the observation in the second observation mode;

a control section which, when the observation mode is switched from the second observation mode to the first observation mode based on an output of the detecting section, controls an operation of the first focusing section based on the person position recognized by the recognizing section during the observation in the second observation mode, so that the person position is focused in the first observation mode; and a fixation detecting section which detects that the electronic imaging apparatus is fixed, wherein the control section allows, in the first observation mode, use of the person position recognized by the recognizing section during the observation in the second observation mode, when the fixation detecting section detects that the electronic imaging apparatus is fixed.

2. A single lens reflex type electronic imaging apparatus which is selectively operable in a first observation mode in which a subject image can optically be observed via an optical finder and a second observation mode in which the subject image is obtained as image data from an image pickup device and is displayed in a monitor for observation, the apparatus comprising:

a detecting section which detects a noise level of the image pickup device;

a first focusing section which focuses a subject during observation in the first observation mode;

a recognizing section which recognizes a person position based on the image data from the image pickup device during observation in the second observation mode to store the person position together with attribute information;

a second focusing section which focuses the person position recognized by the recognizing section during the observation in the second observation mode;

a control section which, when the observation mode is switched from the second observation mode to the first observation mode based on an output of the detecting section, controls an operation of the first focusing section based on the person position recognized by the recognizing section during the observation in the second observation mode, so that the person position is focused in the first observation mode; and a vibration detecting sensor which detects vibration of the electronic imaging apparatus, wherein the control section judges whether or not to utilize, in the first observation mode, the person position recognized by the recognizing section during the observation in the second observation mode, based on an output of the vibration detecting sensor.

3. A single lens reflex type electronic imaging apparatus which is selectively operable in a first observation mode in which a subject image can optically be observed via an optical finder and a second observation mode in which the subject image is obtained as image data from an image pickup device and is displayed in a monitor for observation, the apparatus comprising:

a detecting section which detects a noise level of the image pickup device;

a first focusing section which focuses a subject during observation in the first observation mode;

a recognizing section which recognizes a person position based on the image data from the image pickup device during observation in the second observation mode to store the person position together with attribute information;

a second focusing section which focuses the person position recognized by the recognizing section during the observation in the second observation mode;

a control section which, when the observation mode is switched from the second observation mode to the first observation mode based on an output of the detecting section, controls an operation of the first focusing section based on the person position recognized by the recognizing section during the observation in the second observation mode, so that the person position is focused in the first observation mode; and a vibration detecting sensor which detects vibration of the electronic imaging apparatus, wherein the control section corrects and utilizes, in the first observation mode, the person position recognized by the recognizing section during the observation in the second observation mode, based on an output of the vibration detecting sensor.

4. A single lens reflex type electronic imaging apparatus which is selectively operable in a first observation mode in which a subject image can optically be observed via an optical finder and a second observation mode in which the subject image is obtained as image data from an image pickup device and is displayed in a monitor for observation, the apparatus comprising:

a selection switch which selects one of the first observation mode and the second observation mode;

a first focusing section which focuses a subject during observation in the first observation mode;

a recognizing section which recognizes a person position based on the image data from the image pickup device during observation in the second observation mode to store the person position together with attribute information;

a second focusing section which focuses the person position recognized by the recognizing section during the observation in the second observation mode;

a control section which switches from the second observation mode to the first observation mode and which utilizes, in the first observation mode, the person position recognized by the recognizing section during the observation in the second observation mode, when the selection switch changes selection from the second observation mode to the first observation mode, to control an operation of the first focusing section so that the subject is focused; and a fixation detecting section which detects that the electronic imaging apparatus is fixed, wherein the control section allows, in the first observation mode, use of the person position recognized by the recognizing section during the observation in the second observation mode, when the fixation detecting section detects that the electronic imaging apparatus is fixed.

5. A single lens reflex type electronic imaging apparatus which is selectively operable in a first observation mode in which a subject image can optically be observed via an optical finder and a second observation mode in which the subject image is obtained as image data from an image pickup device and is displayed in a monitor for observation, the apparatus comprising:

a selection switch which selects one of the first observation mode and the second observation mode;

a first focusing section which focuses a subject during observation in the first observation mode;

a recognizing section which recognizes a person position based on the image data from the image pickup device during observation in the second observation mode to store the person position together with attribute information;

a second focusing section which focuses the person position recognized by the recognizing section during the observation in the second observation mode;

a control section which switches from the second observation mode to the first observation mode and which utilizes, in the first observation mode, the person position recognized by the recognizing section during the observation in the second observation mode, when the selection switch changes selection from the second observation mode to the first observation mode, to control an operation of the first focusing section so that the subject is focused; and a vibration detecting sensor which detects vibration of the electronic imaging apparatus, wherein the control section judges whether or not to utilize, in the first observation mode, the person position recognized by the recognizing section during the observation in the second observation mode, based on an output of the vibration detecting sensor.

6. A single lens reflex type electronic imaging apparatus which is selectively operable in a first observation mode in which a subject image can optically be observed via an optical finder and a second observation mode in which the subject image is obtained as image data from an image pickup device and is displayed in a monitor for observation, the apparatus comprising:

a selection switch which selects one of the first observation mode and the second observation mode;

a first focusing section which focuses a subject during observation in the first observation mode;

a recognizing section which recognizes a person position based on the image data from the image pickup device during observation in the second observation mode to store the person position together with attribute information;

a second focusing section which focuses the person position recognized by the recognizing section during the observation in the second observation mode;

a control section which switches from the second observation mode to the first observation mode and which utilizes, in the first observation mode, the person position recognized by the recognizing section during the observation in the second observation mode, when the selection switch changes selection from the second observation mode to the first observation mode, to control an operation of the first focusing section so that the subject is focused; and a vibration detecting sensor which detects vibration of the electronic imaging apparatus, wherein the control section corrects and utilizes, in the first observation mode, the person position recognized by the recognizing section during the observation in the second observation mode, based on an output of the vibration detecting sensor.

* * * * *